Patented Apr. 1, 1941

2,236,900

UNITED STATES PATENT OFFICE 2,236,900

RECONSTITUTED FELT AND MANUFACTURE OF SAME

Harold W. Greider, Wyoming, and Marion F. Smith, Cincinnati, Ohio, assignors to The Philip Carey Manufacturing Company, a corporation of Ohio No Drawing. Application September 6, 1935, Serial No. 39,499

8 Claims. (Cl. 92—21)

This invention relates to the manufacture of felted products fabricated from a pulp suspension of feltable fibers, thermoplastic material and granular material, and particularly pertains to felted products reconstituted from waste thermoplastic treated fabrics, woven and felted, such as those which accumulate in the manufacture of bituminized fabrics for building, waterproofing and insulating purposes and the like such as prepared roofings where a fabric foundation, felted or woven, is saturated and/or coated with suitable waterproofing thermoplastic substances. The invention relates to the method of reconstituting the waste thermoplastic material treated fabrics into a uniformly mixed and homogeneous felted sheet and products made therefrom. It also relates to thermoplastic material compounded with suitable proportions of feltable fibers and inorganic material, said inorganic material being finely dispersed and held in suspension throughout the mass.

The thermoplastic substance treated fabric material comprises that which is saturated or coated only, that which is both saturated and coated, and, particularly in the prepared roofing industry, that which is saturated, coated and is covered with granular or finely divided mineral or other surfacing material partially embedded in the coating, which may also contain fine mineral filler dispersed therein. The fabric material varies greatly as to character and kind, including felted fabrics composed of various types of fibrous material, such as rags, sacks and bagging, carpet waste, waste cotton, waste paper, wood pulp, or other vegetable fiber, animal or mineral fibers, and woven fabrics, such as burlap, canvas and the like. So, too, does the granular surfacing material vary in size, ranging from fine powder to coarse granules, and kind, including such different materials as silica, slate, crushed stone, brick or tile, granulated slag, small pebbles or gravel, granulated cork, mica flakes, talc and many other materials.

In the roofing industry, for example, much of the waste in making roll roofing results from defective portions of the formed sheets, edgings and the like which are relatively large in size, whereas in making strip and individual shingles much of the waste results from cut-outs when said shingles are cut from the parent sheets. Accordingly, it will be readily apparent that the waste material varies greatly both as to the size of the waste pieces as well as in their composition and structure.

Many attempts have been made to reclaim the waste material for various uses, but these have met with only partial success in that they have all been directed to the disintegration of the components of the waste material to a plastic mass suitable only for molding and not one that could be reconstituted into a feltable water suspension or pulp stock suitable for reforming into a waterlaid felt.

It is one of the aims of the present invention to reduce this heterogeneous waste material to a homogeneous, uniformly mixed pulp stock suitable for being reconstituted into a waterlaid felt as distinct from a sheet or slab formed by molding the mass into form. A further aim of the invention is to effect disintegration of the waste material by means of apparatus more conventional for use in the manufacture of the original products from which the waste accumulates rather than being of special design and adapted only for the disintegration of the waste material.

Generally described, the heterogeneous waste may be collected as it accumulates in the production of thermoplastic material treated products and advantageously subjected to a shredding or cutting device for reducing same to smaller pieces and making them more uniform for convenient handling in subsequent operations. While this step is preferable, especially for speeding up production, it is not indispensable as subsequent steps of the process are sufficient for homogenizing the waste material.

After being shredded, cut, or otherwise reduced to smaller pieces for more convenient handling, the waste material is subjected to a mechanical dispersing operation in the presence of water, said mechanical operation being sufficiently drastic to break down the thermoplastic component and disperse same through the mass. This may be effected in a conventional beater for the preparation of feltable pulp stock which comprises a beater roll adjacent a stationary plate to which the waste material is fed in a circulating chamber. A sufficient amount of water is used in the circulating chamber to facilitate circulation of the waste material through the beater. This is preferably heated to render the thermoplastic material content fluid or semi-fluid and adapted to be readily circulated and effectively dispersed in the beating operation without sticking and gumming the beater apparatus and circulating chamber. This heating may preferably raise the water temperature to a range of from 170° to 212° F. Other materials may also be added to render the thermoplastic material non-adhesive and for dispersing same in fine particles throughout the pulped stock. Various hydrous gel-forming inorganic compounds are suitable as dispersing agents, these being typified by such materials as ball clay, kaolin, Portland cement, bentonite clay, magnesium oxide, colloidal silica and the like or a mixture of two or more of such materials in varying proportions. With any one of these or a mixture thereof there may in some cases advantageously be used a suitable surface tension reducing material, typified by such materials as soap, sulphonated oils and their salts, saponified rosins, salts of sulphonated higher fatty alcohols and the like as suitable examples. The surface tension reducing means should be one that is compatible with the dispersing agent. Protective colloids such as glue, starch and casein may also be used as adjunctive dispersing and stabilizing agents for the thermoplastic material.

In prepared roofing comprising a saturated felt base, the felt ordinarily is saturated with asphalt to about 150% to 200% of the dry weight of the fabric. Thus the saturant together with the thermoplastic coatings, applied to the saturated felt foundation usually considerably preponderates (by weight) in proportion to the fiber and/or mineral content. Accordingly it may be desirable to add additional fibrous filling material, preferably any suitable vegetable, mineral or animal fibers as these will dilute the thermoplastic component and increase the felting qualities of the pulp stock and permit same to be felted in a conventional manner on a cylinder or Fourdrinier felt or paper machine. The additional fibrous material has the further advantage of reducing any tendency of the beaten stock to be adherent to the apparatus in which it is being treated. Suitable fibrous material for this purpose is typified by cotton, wool, jute, rag, paper, and others generally employed in making roofing fabrics. On the other hand the non-thermoplastic content of the waste roofing material may preponderate in proportion to the thermoplastic content, or it may be desirable to modify the fiber composition of the reconstituted felt by adding a considerable quantity of fibrous material, in which event a quantity of thermoplastic material may also be added. This may be added at any stage of the process prior to felting but is preferably at the point where the water and dispersing agent are added, which in conventional felt making apparatus would be the beater. Addition of it at any early stage of the process facilitates mixing and dispersion of same while the other ingredients are undergoing the same treatment. The added thermoplastic material is represented by any relatively soft flux type, blown saturant type or previously emulsified asphalt. One advantage of adding thermoplastic material of this type is that the roofing scrap has a large amount of bituminous adhesive coating on the surface or surfaces thereof, and the soft flux or blown saturant incorporated therewith will blend with the adhesive coating material of harder consistency and higher softening point and facilitate its dispersion throughout the pulped stock. Furthermore the pulped stock and the sheet felted therefrom will be softer and more flexible.

The waste material with or without the added fibrous material, is beaten in water at a suitable temperature to reduce the fibrous content to the condition of pulp stock and until the thermoplastic content has been dispersed throughout the water and thoroughly mixed with the fibrous pulp stock. The mechanical treatment thus far described has been aimed at breaking down and dispersing the thermoplastic content throughout the pulp stock. The granular material may be incidentally broken down somewhat, although not to any great extent, but it will be thoroughly distributed throughout and suspended in the pulp stock which is suitable for being waterlaid into a web on a cylinder machine or on a Fourdrinier machine. On dilution of the pulp stock with additional water a part of the coarser mineral granule material may settle out and be separated from the pulp stock, while the finer mineral particles remain suspended in the fibrous pulp stock.

The waste materials are ordinarily, by the foregoing treatment, suitably disintegrated with the fibrous content refined to a pulp condition for felting. However, there may be further refining in a beater or Jordan device if further refining be desired.

The felted web may be smooth finished or it may be embossed. By reason of the thermoplastic ingredient in the sheet, the sheet is particularly suitable for receiving embossments which may be provided by an embossing roll associated with the calender rolls at the discharge end of the cylinder machine. The felt embosses without breaking and at this stage of manufacture is in a warm condition suitable for receiving the embossments. As the sheet cools the embossments are permanently retained. Embossed felt sheets are especially adapted for heat insulating, lining and sound deadening purposes.

The web after drying, whether embossed or smooth finished, may be further waterproofed by being impregnated with a saturant and/or coated on one or both sides with a layer of thermoplastic material such as a bituminous adhesive compound. Granular surfacing material may also be partially embedded on one or both of the coating layers. Sheets thus produced are particularly adapted for weather surfacing, in that the waterproofing material is more thoroughly dispersed throughout the fibrous content, thereby better protecting same against exposure to the elements. Likewise, the mineral content retained in the pulp stock is thoroughly distributed throughout the felted sheet giving same a more durable character and spacing the fibers therein to increase the permeability of the sheet for the reception of the waterproofing material.

While the invention has been described above particularly in reference to asphaltic treated felt products, it is likewise suitable for making reconstituted felt from fabrics impregnated and/or coated with various and many other kinds of thermoplastic materials, such as crude and reclaimed rubber, rosin, synthetic resins, drying oil compositions of the character of linseed, Chinawood oil and the like, shellacs, paraffin, natural fossil resins, tar, cumarone resin and others which are used in various forms for treating fibrous products.

A suitable batch for treatment may comprise by weight any proportion of thermoplastic substance treated fabric to a maximum of about seventy-five parts and the balance, on the basis of one hundred parts, of fibrous material. To this base from five to twenty parts dispersing agent may be added, with sufficient water to bring the batch to the desired consistency.

While the invention has been described in detail as to the process of manufacture and the resulting product, it will be understood, however, that it is not limited thereby but that there may be various changes wtihout departing from the invention.

We claim:

1. A process for reconstituting thermoplastic substance treated fabrics into a felted sheet comprising subjecting thermoplastic substance treated fabrics containing granular mineral material to a disintegrating operation in the presence of an aqueous liquid for disintegrating same into a pulp stock with the mineral material and with the thermoplastic substance dispersed therethrough, and felting the pulp stock including the mineral material into a sheet.

2. A process for reconstituting thermoplastic substance treated fabrics into a felted sheet comprising subjecting granular mineral surfaced thermoplastic substance treated fabrics to a disintegrating operation in the presence of an aqueous liquid for disintegrating same into a homogeneous pulp stock with the mineral material and thermoplastic substance dispersed therethrough, heating said fabrics and aqueous liquid while being subjected to the disintegrating operation, and felting the pulp stock including the mineral material into a sheet.

3. A process for reconstituting thermoplastic substance treated fabrics into a felted sheet comprising subjecting granular mineral surfaced thermoplastic substance treated fabrics to a disintegrating operation in the presence of an aqueous liquid for disintegrating same into a pulp stock with the mineral material and the thermoplastic substance dispersed therethrough, incorporating an agent to facilitate dispersion of the thermoplastic substance through the pulp stock, and felting the pulp stock including the mineral material into a sheet.

4. A process for reconstituting thermoplastic substance treated fabrics into a felted sheet comprising subjecting granular mineral surfaced thermoplastic substance treated fabrics to a disintegrating operation in the presence of an aqueous liquid for disintegrating same into a pulp stock with the mineral material and the thermoplastic substance dispersed therethrough, treating the pulp stock to refine the fibrous content and mix the granular mineral material, and felting the pulp stock including the mineral material into a sheet.

5. A process for reconstituting thermoplastic substance treated fabrics into a felted sheet comprising subjecting granular mineral surfaced thermoplastic substance treated fabrics to a disintegrating operation in the presence of an aqueous liquid for disintegrating same into a pulp stock with the mineral material and the thermoplastic substance dispersed therethrough, heating the pulp stock, incorporating an agent for dispersing the thermoplastic substance, subjecting the pulp stock to a rolling operation to refine the fibrous content and mix the granular material, and felting the pulp stock including the mineral material into a sheet.

6. A felted product formed from thermoplastic substance treated fabrics, containing granular material, reconstituted in a sheet with the components homogeneously mixed together, the granular material interspersed and the fibers in felted relation.

7. A felted product formed from thermoplastic substance treated material containing fibers and granular materials reconstituted in a sheet with the granules interspersed and the components mixed together and the fibers in felted relation.

8. A felted product formed from granular surfaced thermoplastic substance treated fabrics reconstituted with the components homogeneously mixed together and the fibers in felted relation.

HAROLD W. GREIDER.
MARION F. SMITH.